Nov. 20, 1928.                                         1,692,008
W. A. VAN BRUNT
BEARING
Filed June 29, 1922
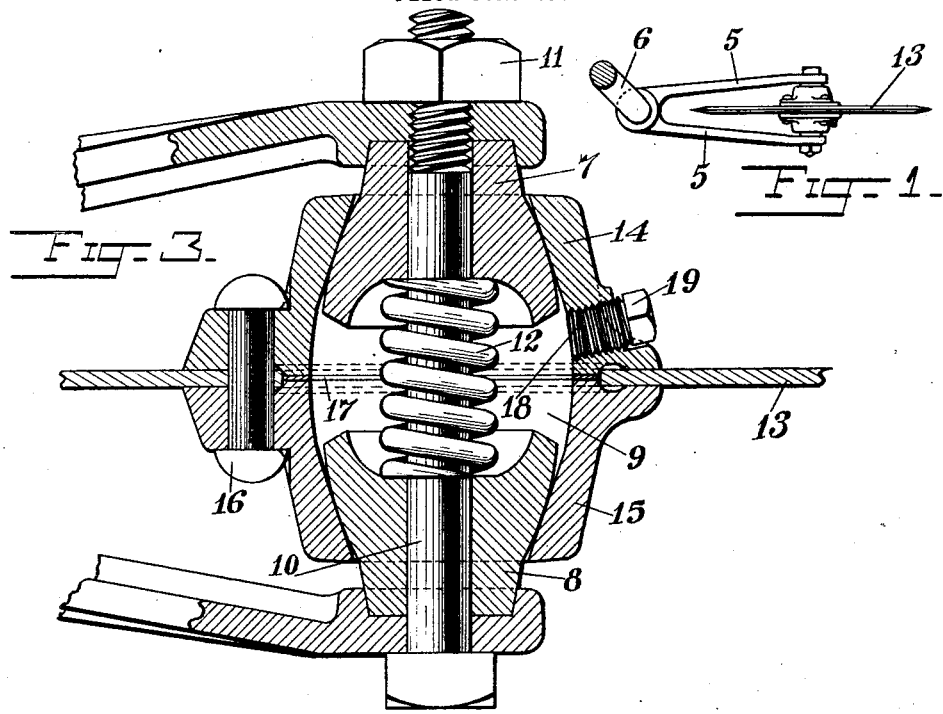
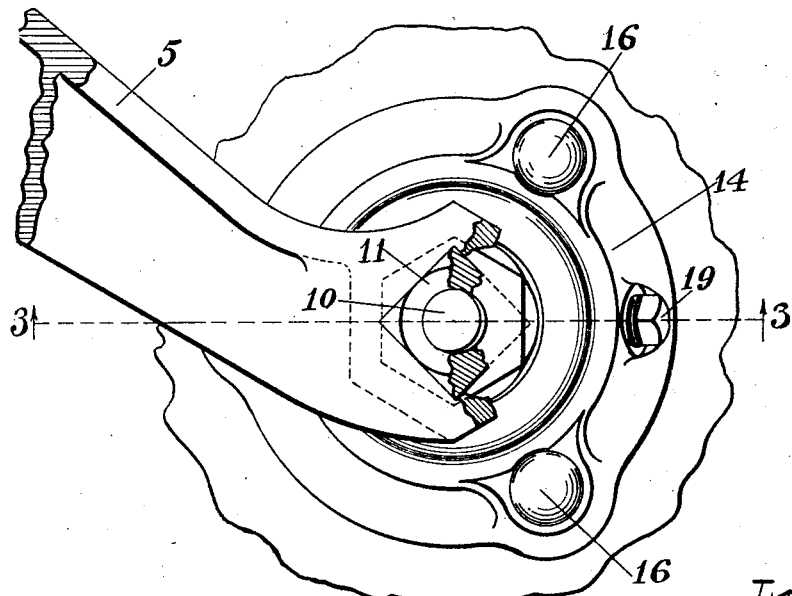

Patented Nov. 20, 1928.

1,692,008

UNITED STATES PATENT OFFICE.

WILLARD A. VAN BRUNT, OF LOS ANGELES, CALIFORNIA, ASSIGNOR TO DEERE & COMPANY, OF MOLINE, ILLINOIS, A CORPORATION OF ILLINOIS.

BEARING.

Application filed June 29, 1922. Serial No. 571,775.

This invention relates to improvements in bearings particularly designed for use in connection with plow colters, although not necessarily limited to such use. The bearings for plow colters are subjected to severe usage as they work in dust and trash, and unless freely lubricated the wear upon the bearings and upon the surface of the colter hub that rotates thereupon is rapid and destructive. Even when well lubricated the wear is sufficient to necessitate adjustments from time to time to compensate therefor. It is the object of my present invention to provide a construction that will ensure a free application of lubricant to the wearing surfaces; to provide a plurality of non-rotating bearing members normally held spaced apart by spring means interposed between them and which spring means will, upon a loosening of the means that connects said members to their supporting devices, automatically move the bearing members in opposite directions to compensate for wear of the bearing surfaces; and to improve generally bearing devices of this general character. I attain this object by the construction and arrangement of parts shown in the drawing and hereinafter described. That which I believe to be new will be set forth in the claims.

In the drawing,—

Fig. 1 is a plan view of a plow-colter and the fork in which it is supported;

Fig. 2 is an enlarged view, being a side elevation, with some parts broken away, of the devices shown in Fig. 1; and Fig. 3 is a cross-section taken substantially on the line 3—3 of Fig. 2.

Referring to the several figures of the drawing,—5 indicates the arms of a fork, which has swiveling connection with the lower end of a standard 6 that is adapted to be clamped in any usual manner to a plow beam. Between the fork arms is located the bearings upon which the hub of a colter is rotatably mounted. The bearing is usually in the form of a spindle, the ends of which are secured in the ends of the fork arms, but in my present invention I substitute for such spindle two coaxial conical heads indicated by 7 and 8, respectively, each head having its inner end portion enlarged and the surface thereof rounded or curved to form bearing surfaces for the hub of the colter to rest against—the two contacting surfaces being smooth and hardened, as usual in connection with such wearing parts. Each of the heads 7—8 at its outer end is provided with one or more flattened surfaces, so that when fitted into a correspondingly shaped opening in a supporting member rotation will be effectually prevented. The fork arms are the supporting members for these heads, and their thickened outer end portions are recessed on their inner faces to adapt them to receive and hold the outer ends of the heads. Preferably, such recesses and the portions of the heads that enter therein are made hexagonal, as clearly shown in Fig. 2. The two heads are spaced a considerable distance apart whereby is provided, when covered by the colter hub as hereinafter described, a reservoir of a capacity large enough to contain a considerable quantity of lubricant. This reservoir is indicated by 9. Passing centrally through the two heads and through the fork arms is a bolt 10, the head of which bears against the outer face of one fork arm and the other end portion of which has screw-threaded connection with the other fork arm and also carries a jam nut 11 which, when tightened up, bears against the outer face of such fork arm. Located within the reservoir 9, and surrounding the central portion of the bolt 10, is a strong coiled spring 12 that bears at its ends against the two heads 7 and 8 and, of course, acts to keep such heads constantly forced outwardly. The inner end faces of the heads are preferably cupped or recessed, as shown, to receive the ends of the spring.

13 indicates a plow colter having the usual large central opening to allow of the passage therethrough of the bearing members, and surrounding such opening is a hub formed of two wide parts 14, 15, secured to opposite sides of the colter by a plurality of rivets 16. Interposed between the inner edge portions of the hub members that project, as shown in Fig. 3, opposite the inner edge of the colter is a gasket 17 that is provided to prevent the escape of lubricant at the joint between such hub parts. Through one of the hub parts—14 in the construction shown—is a screw-threaded opening 18, through which lubricant may be inserted into the reservoir 9. It is normally closed by a plug 19 screwed therein.

The inner face or bearing surface of each hub part is to be conical or curved so as to correspond generally to the surfaces of the heads, thereby forming proper working faces that will allow of the turning of the hub freely on the non-rotating heads, and will permit tightening of the bearing by forcing the heads apart. Lubricant from the reservoir 9 will pass between the wearing surfaces of the hub and heads, so as to freely lubricate them to allow the hub to rotate with the minimum amount of friction. Notwithstanding such free lubrication of the bearing, there will necessarily occur more or less wear on the parts, which must be compensated for by proper adjustments, and adjustment of the heads toward or from each other is quickly and easily accomplished at any time by loosening the nut 11 on the bolt 10, and rotating said bolt, for it will be evident that screwing of the bolt in the arm 5 shown at the top of Fig. 3 will cause a simultaneous movement of the heads toward each other against the action of the coiled spring, whereas unscrewing of the bolt will permit such heads to be moved away from each other under the pressure of the spring—the fork arms 5 yielding in either case sufficiently to permit of these movements.

By my invention I provide a very simple and inexpensive construction that will well withstand the rough usage to which devices such as plow colters are necessarily subjected, and one which will contain within itself a sufficiently large body of lubricant to keep the bearing surfaces well lubricated for a very considerable period of time. Furthermore, it is evident that in my invention the necessary adjustment of the bearing members can be made with great ease and readiness, and of course to any extent desired, merely by loosening the nut 11 and turning the retaining bolt.

What I claim as my invention and desire to secure by Letters Patent, is—

1. In combination, two endwise-movable non-rotating bearing members spaced apart to form a reservoir for lubricant, laterally-yielding supports for said bearing members, adjustable means for locking said members to their supports, means located in said reservoir for automatically moving said members in opposite directions when said locking means is adjusted in one direction, and a rotatable device mounted on said bearing members and extending over and forming a cover for said reservoir.

2. In combination, two endwise-movable non-rotating bearing members spaced apart to form a reservoir for lubricant, laterally-yielding supports for the outer end portions of said members, a rotatable device mounted on said members and extending over and forming a cover for said reservoir, a bolt passing through said members and their supports, a spring around an intermediate portion of the bolt tending to normally force said bearing members in opposite directions, and a nut on the bolt for holding said members and their supports in different adjusted positions.

3. In combination, two endwise-movable non-rotating bearing members spaced apart to form a reservoir for lubricant, laterally-yielding supports for the outer end portions of said members, a rotatable device mounted on said members and extending over and forming a cover for said reservoir, a bolt passing through said members and their supports and operable to adjust said supports toward or from each other, and a spring around an intermediate portion of the bolt tending to normally force said bearing members in opposite directions.

4. A bearing comprising two coaxially disposed conical bearing members, supports for the outer ends thereof, a rotatable device having conical bearing surfaces engaging directly with the conical surfaces of said bearing members, a spring interposed between said bearing members normally tending to force them apart, a bolt passing freely through a hole in one of said supports and having a threaded end screwing into a threaded hole in the other of said supports whereby rotation of said bolt operates positively to vary the spacing between said supports, and means for normally holding said bolt against rotation.

5. In combination, a bearing comprising two coaxially disposed conical bearing members, two spaced supporting arms having non-circular sockets in the inner faces thereof, said bearing members having non-circular end portions engaging non-rotatably in said sockets, a bolt passing through said bearing members and said arms for adjustably limiting the spacing between said arms, a spring interposed between said bearing members normally tending to force them apart, and a rotatable device having a hub adapted to bear upon the conical outer surfaces of said bearing members.

6. In combination, a bearing comprising two endwise movable, coaxially disposed bearing members spaced apart to form a reservoir for lubricant, laterally yielding supports for the outer end portions of said members, said supports having non-circular openings therein, said bearing members having non-circular end portions engaging non-rotatably in said openings, a bolt passing through said bearing members and said supports for adjustably limiting the spacing between said supports, a spring around an intermediate portion of said bolt tending to normally force said bearing members in opposite directions, a nut on said bolt for holding said members and their supports in different adjusted positions, and a rotatable device mounted on said members and extending over and forming a cover for said reservoir.

WILLARD A. VAN BRUNT.